United States Patent [19]

Yamaguchi et al.

[11] Patent Number: 5,671,713
[45] Date of Patent: Sep. 30, 1997

[54] CONTROL DEVICE AND APPARATUS FOR GENERATING SWIRLS IN INTERNAL COMBUSTION ENGINE

[75] Inventors: Junichi Yamaguchi, Hitachi; Minoru Ohsuga; Ryoichi Komuro, both of Katsuta, all of Japan

[73] Assignee: Hitachi, Ltd., Japan

[21] Appl. No.: 646,815

[22] Filed: May 21, 1996

Related U.S. Application Data

[63] Continuation of Ser. No. 397,183, Mar. 9, 1995, abandoned.

[51] Int. Cl.$^6$ ............................... F02B 31/00
[52] U.S. Cl. ............................... 123/308
[58] Field of Search ............................... 123/308, 306

[56] References Cited

U.S. PATENT DOCUMENTS

| | | | |
|---|---|---|---|
| 4,467,749 | 8/1984 | Maeda | 123/306 |
| 4,499,868 | 2/1985 | Kanda et al. | 123/306 |
| 4,669,434 | 6/1987 | Okumura et al. | 123/308 |
| 5,231,964 | 8/1993 | Harada | 123/306 |
| 5,267,543 | 12/1993 | Novak et al. | 123/306 |
| 5,370,098 | 12/1994 | Iida | 123/306 |

FOREIGN PATENT DOCUMENTS

| | | | |
|---|---|---|---|
| 60-230543 | 11/1985 | Japan | 123/308 |
| 63-150052 | 10/1988 | Japan | 123/308 |
| 5-86873 | 4/1993 | Japan | 123/308 |

OTHER PUBLICATIONS

International Search Report dated October 5, 1993.

*Primary Examiner*—Raymond A. Nelli
*Attorney, Agent, or Firm*—Evenson, McKeown, Edwards & Lenahan, P.L.L.C.

[57] ABSTRACT

A control device in an internal combustion engine, interlocking with a device to generate swirls in a combustion chamber of the internal combustion engine by providing bypass passages which allow air to bypass a throttle valve for regulating intake air flow rate of the internal combustion engine to control an output power of the internal combustion engine and allow the air to flow in from the side of atmosphere to communicate with air intake ports for respective cylinders on the downstream side of the throttle valve. The device comprises sensors to detect a vehicle speed, a gear position, an opening of an accelerator, an intake air flow rate and the like and a processor to determine an operating state of the internal combustion engine such as a rotating speed, a torque and the like based on the signals from the sensors, calculating an operating condition of the internal combustion engine according to the strength of swirl to be generated based on the operating state, outputting the calculated values as control signals.

26 Claims, 7 Drawing Sheets

CONTROL DEVICE AND APPARATUS FOR GENERATING SWIRLS IN INTERNAL COMBUSTION ENGINE

This is a continuation of application Ser. No. 08/397,183, filed Mar. 9, 1995, abandoned.

BACKGROUND AND SUMMARY OF THE INVENTION

The present invention relates to an engine and, more particularly, to a lean burn engine system in which swirls are generated in the combustion chamber corresponding to the operating state of the engine to improve the combustion even in a lean air-fuel ratio.

The improvement of combustion capability by generating swirls in the combustion chamber of an engine is known. Further, there is also known a technology to improve fuel consumption rate in which lean air-fuel ratio operation of an engine is performed during a low load operating period in order to decrease pumping loss of the engine.

By combining the above technologies, during a low load operating period an engine is operated under condition of lean mixture and generating swirls to improve the combustion capability for decreasing fuel consumption rate, which is well known as so-called lean burn engine technology.

In the technology of this type, the swirl is preferably adjusted in an optimum strength corresponding to the operating condition of the engine. More particularly, during a low load operating period the swirl is strengthened to improve the combustion capability, and during a high load operating period the swirl is weakened to suck a great amount of air to increase the output power. In order to realize the above, a technology is described in, for example, Japanese Patent Application Laid-Open No. 61-58921 (1986) where an engine of two intake valve type is constructed such that one of the intake valves composes a straight port having an intake control valve, and the other composes a helical port having a bypass passage opened by the intake control valve. With this construction, during a low load operating period, the intake control valve is held close to suck air through only the passage in the side of the helical port to generate a strong swirl in the combustion chamber. On the other hand, during a high load operating period, the intake control valve is held open to suck air through the helical port and the straight port and further through a bypass passage communicating from the straight port side to the helical port side to increase the output power by increasing the amount of intake air.

However, in such an engine constructed as above, when the engine is operated under various conditions, there arise problems as follows.

Firstly, there is essentially only one mechanism to generate an optimum swirl, and consequently it is not possible to set operating conditions of the engine in which optimum swirl is generated except only one condition. Therefore, for example, when the engine is set so as to generate an optimum swirl during a low load operating period in a state of holding the intake control valve closed, during an intermediate load operating period of the engine the sufficient intake air flow rate cannot be supplied through only the helical port and consequently there arises a problem in that the operating range of the engine capable of operating with lean air-fuel ratio is narrowed. In the contrary, when the engine is set so as to generate an optimum swirl during an intermediate load operating period, during a low load operating period of the engine there arises a problem in that the swirl is weakened due to decrease in the speed of intake air flow.

During a high load operating period of the engine, there arises a problem in that the output power is decreased due to decrease in the intake air flow rate comparing to the case of a conventional engine which has two straight ports although a large amount of air flow is sucked through the helical port and the swirl is weakened by the bypass passage.

Further, in the engine constructed as described above, one large swirl is generated in the horizontal or in a tilting direction inside the combustion chamber. However, there is a problem in that such a large swirl has a small effect to improve the combustion because the rotating energy of large swirl has relatively a small effect on mixing air and fuel. Especially in a spark ignition engine of fuel injecting type, in a case of having two intake valves as described above, the mist from a fuel injection valve is generally formed in bi-directional mist flows directing from the intake pipe to the intake valves. However, the mist is attached to the wall of the intake pipe passage or the wall of the combustion chamber. During an intermediate load operating period of the engine, the fuel is blown aside in the combustion chamber by the large swirl in the horizontal or in a tilting direction described above, which causes a problem in that the fuel near the wall is exhausted without burning to increase HC content in the exhaust gas, or the fuel consumption rate is increased. Furthermore, there is a problem in that only a part of the combustion chamber becomes at a high temperature during combustion period to increase $NO_x$ content in the exhaust gas.

The items of the problems to be solved by the present invention are as follows.

Firstly, to provide apparatus for generating a swirl having a proper strength in a wide operating region of an engine.

Secondarily, to provide apparatus which has a good suction characteristic to suppress a decrease in the output power during a high load operating period of the engine, and is capable of generating a swirl having a proper strength during an intermediate and low load operating period.

Thirdly, to provide such a swirl and swirl generating apparatus that the swirl is capable of effectively mixing fuel and air, the mist of the fuel does not attach to the wall of intake pipe or the wall of combustion chamber, the ignitability is good, the combustion efficiency is high, and the exhaust gases such as HC, $NO_x$ and the like are suppressed.

In order to solve the above problems, the present invention can provide the following.

Initially, a plurality of sub-air-intake passages are provided separately from the main passage of air-intake pipe. The total sum of the cross-sectional areas the sub-air-intake pipes is made smaller than the cross-sectional area of the main air-intake passage. The outlet of the sub-air-intake passage opens to a position near an intake valve inside the main air-intake passage, and is directed to the gap portion between the intake valve and a corresponding intake valve sheet such that air enters from the outer side opposite to the facing side of the two intake valve sheets. The fuel mist enters from the inner side of the two intake valve sheets facing to each other to prevent interference with the intake air when swirls are generated. The respective sub-air-intake passages are constructed such that air enters toward at least two positions inside the combustion chamber. The pipe diameter and the pipe length of the sub-air-intake passage is preferably determined in such a relation as to effectively utilize the inertia effect of the intake air.

Further, apparatus for closing the main passage and means for closing at least one of the sub-air-intake passages depending on the operating state of the engine are provided.

During a low load operating period of the engine, the main passage and a part of the sub-air-intake passages are kept close, and, thereby, swirls are generated inside the combustion chamber by the air flowing through the remaining sub-air-intake passages. During an intermediate load operating period, the main passage is kept closed and number of sub-air-intake passages are increased, and, thereby, the need of increasing intake air flow rate is coped with and plural swirls having different center axes are generated in the combustion chamber. When the engine enters into a high load operation, an intake control valve in the main passage is opened and a large amount of intake air is introduced to keep the torque of the engine.

The ignition timing of the mixed gas is delayed compared with the case of a conventional engine without swirl if the combustion speed is increased by the generated swirls. In a state where the swirls are not generated such as at a high load operating state, the ignition timing is set to the same condition as in a conventional engine.

Therein, fuel is injected in advance of the ignition timing by the time interval during which the fuel mist is mixed with the generated swirls and the mixed portion reaches near a spark plug to be ignited. The device is constructed such that the direction of fuel injection is directed toward swirls when the swirls are generated.

By constructing the device as described above, the present invention has the following effects.

Firstly, since the cross-sectional area of the air-intake passage can be changed in multi-step by varying the number of sub-air-intake passages, the swirls generated inside the combustion chamber can be set to a proper strength within the wider operating region of the engine comparing to a conventional engine. Thereby, the total efficiency of combustion in various operating condition of the internal combustion engine can be improved.

Secondly, the amount of intake air flow rate sucked through the sub-air-intake passages is increased due to the inertia effect of intake air through the sub-air-intake passages. Thereby, the region for operating the engine with generating swirls can be expanded.

Thirdly, since there is no need to provide swirl generating apparatus such as a helical port in the main air passage, the air-intake flow resistance of the main passage is small and the larger amount of air can be sucked during a high load operating period.

Fourthly, a plurality of swirls can be generated inside the combustion chamber by using a plurality of sub-air-intake passages. Thereby, the disturbance in the combustion chamber can be increased with the same intake-air flow rate comparing to the case where there is only one swirl, and consequently the mixing of air and fuel is promoted to improve the efficiency of combustion.

Fifthly, since the injection timing of fuel, the ignition timing and the direction of fuel injection are adjusted such that plural swirls are generated around fuel mist and at the same time the fuel is not interfered with intake air, the fuel can be prevented from blowing aside near the wall of the combustion chamber. Thereby, harmful components such as HC, $NO_x$ and the like in the exhaust gas are decreased.

BEST MODE FOR CARRYING OUT THE INVENTION

The embodiments of the present invention will be described in detail below, referring to the accompanying drawings.

Figure 1:
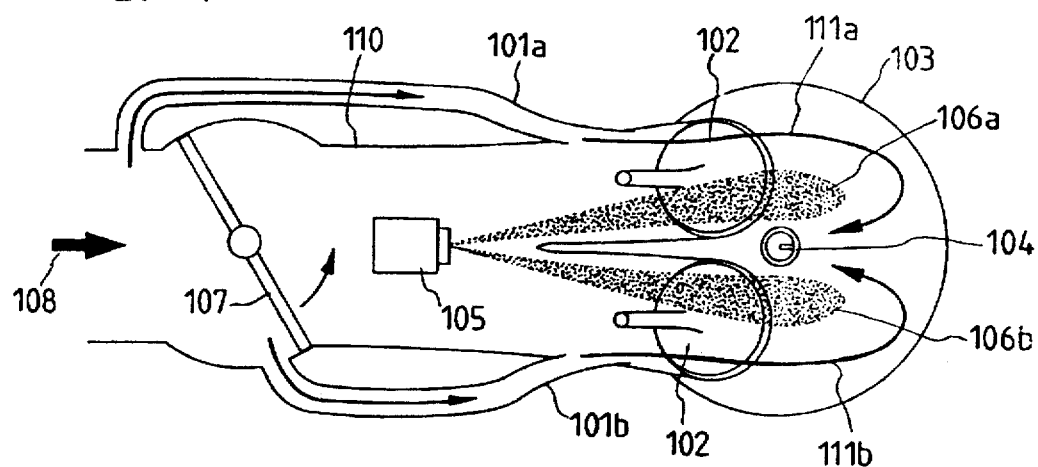
FIG. 1 is a top view showing the construction of a first embodiment in accordance with the present invention.
Figure 2:
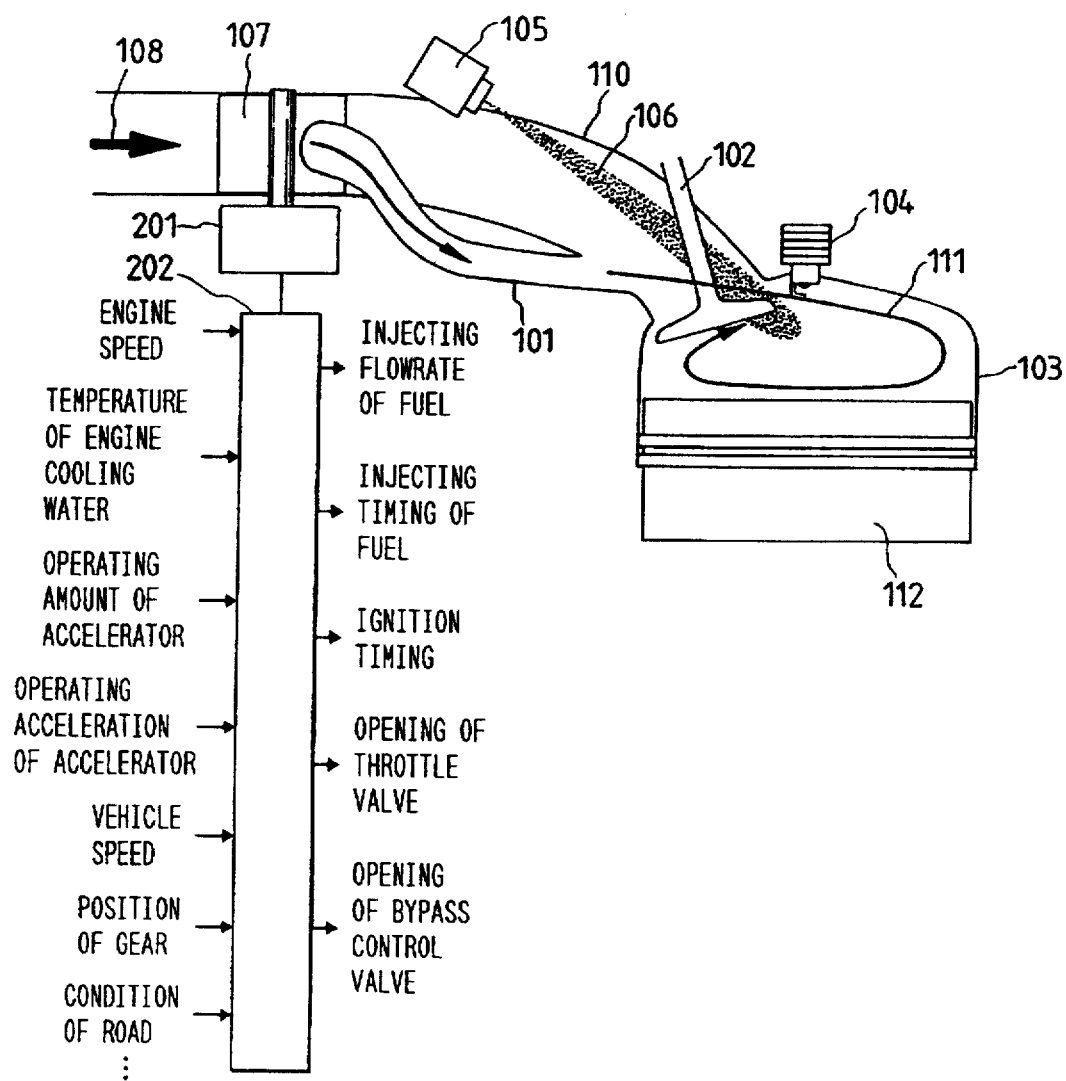
FIG. 2 is a side view showing the construction of the first embodiment in accordance with the present invention.

FIG. 1 and FIG. 2 show a first embodiment according to the present invention. A main passage 110 of an independent air-intake pipe is directed toward a combustion chamber 103 of an engine having two intake valves 102. An intake control valve 107 is provided in the main passage 110, and sub-air-intake passages 101a and 101b are provided in the upstream of the air-intake control valve such as to bypass the main passage 110. The total cross-sectional area of the two sub-air-intake passages 101a and 101b is made such as to become ⅕ to ½ of the cross-sectional area of the upstream of the main passage 110. The intake control valve 107 is constructed such as to have a larger cross-sectional area than the cross-sectional area of the upstream of the main passage 110 and the inlet of the sub-air-intake passage 101b can be closed with the intake control valve 107.

A fuel injection valve 105 forms two mist flows flowing from the main passage 110 toward the inner side of the two intake valves 102 facing each other, that is, directed in two directions 106a and 106b toward the center portion of the combustion chamber.

The outlets of the sub-air-intake passages 101a and 101b open to a position near the intake valve 102. The air flows flowing through the sub-air-intake passages 101a and 101b become jet flows which enter into the combustion chamber 103 through the gaps between the intake valve and the corresponding valve sheet from the outer side of the two intake valves 102 facing each other, that is, from the side near the wall of the combustion chamber to generate two swirls 111a, 111b. Therein, the swirl 111a is formed such as to envelop the mist 106a, and the swirl 111b is formed such as to envelop the mist 106b. Each of the swirls circulates along the top surface of a piston 112 and then flows toward a spark plug 104. Operation of the intake control valve 107 is performed by a stepping motor 201, and setting of the opening of the intake control valve is performed by a computer 202.

Figure 3:
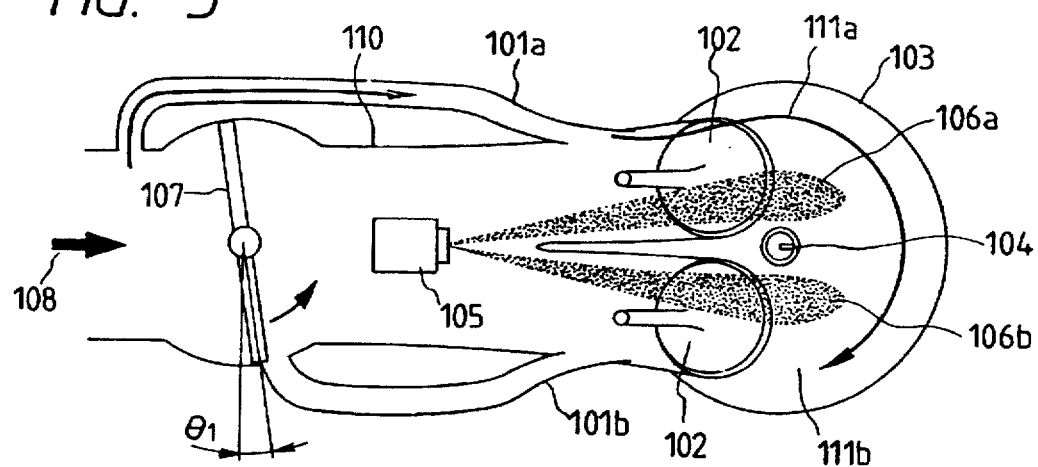
FIG. 3 is a view showing the operation during a low load operating period of the first embodiment in accordance with the present invention.

FIG. 3 shows the operating state during a low load operating period of the first embodiment in accordance with the present invention. The intake control valve 107 is set to a angle θ1 where the main passage 110 and the sub-air-intake passage 101b are kept closed. The air 108 flowing in the upstream of the main passage 110 passes through the sub-air-intake passage 101a and generates a swirl 111a inside the combustion chamber 103. Since the jet flow from the sub-air-intake passage 101a is small compared with the size of the combustion chamber, the air flow sucked through the intake valve 102 can be put aside and therefore a swirl 111a can be generated with a small amount of air flow rate. Although the swirl 111a circulates such as to envelop the fuel mist 106a, 106b, the mist is not blown aside toward the wall of the combustion chamber since the air flow rate is small. Thereby, the combustion can be performed well.

Figure 4:
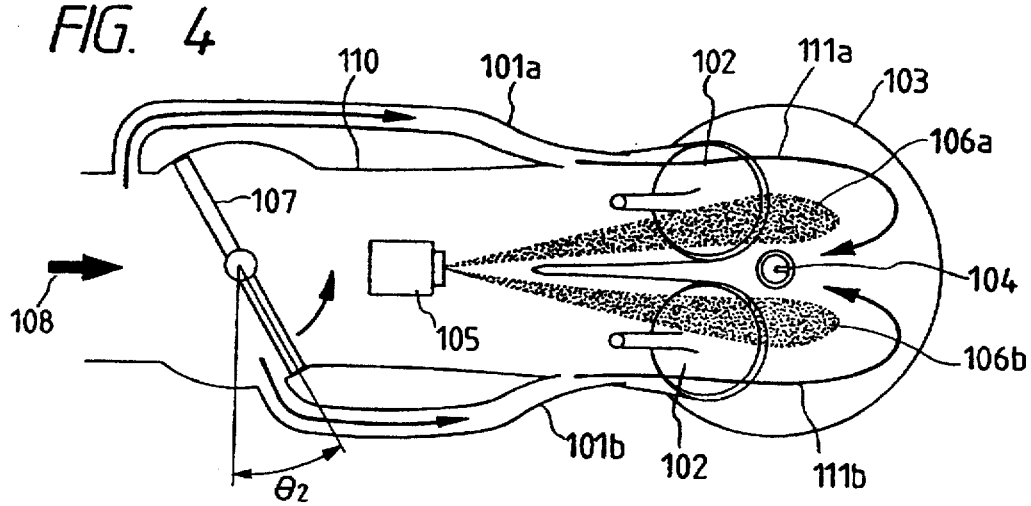
FIG. 4 is a view showing the operation during a intermediate load operating period of the first embodiment in accordance with the present invention.

FIG. 4 shows the operating state during a intermediate load operating period of the first embodiment in accordance with the present invention. The intake control valve 107 is set to a angle θ2 where the main passage 110 is kept closed and the sub-air-intake passage 101b is kept open. The air 108 flowing in the upstream of the main passage 110 passes through the sub-air-intake passages 101a and 101b and generates two swirls 111a and 111b inside the combustion chamber 103. The swirls 111a and 111b circulate such as to envelop the fuel mist 106a and 106b, respectively. The swirls 111a and 111b promote the mixing of air and fuel further than in a case of single swirl with the same intake air flow rate, and the mist is not blown aside toward the wall of the combustion chamber. Thereby, the combustion can be performed well.

Figure 5:
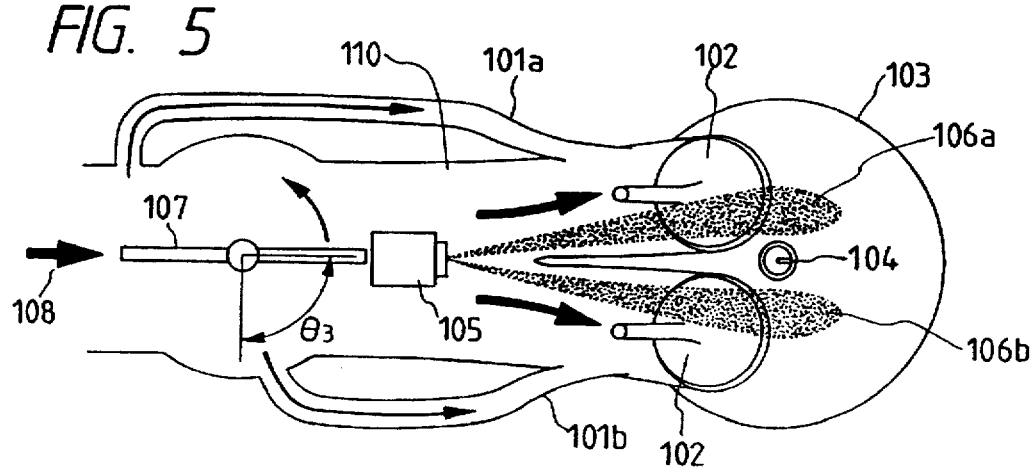
FIG. 5 is a view showing the operation during a high load operating period of the first embodiment in accordance with the present invention.

FIG. 5 shows the operating state during a high load operating period of the first embodiment in accordance with the present invention. The intake control valve 107 is set to a angle θ3. Therein, most of the intake air 108 passes through the main passage 110 to be sucked into the combustion chamber 103. Since there is no swirl generating device such as a helical port and consequently the suction flow resistance is low, a large amount of air can be sucked. Thereby, a required output power can be obtained. Therein, although the sub-air-intake passages 101a and 101b are kept open, each of the air flow rates passing through each of passages is approximately proportional to each of the cross-sectional areas. Therefore, the air flow rates passing through the sub-air-intake passages 101a and 101b are small and consequently generate no swirl.

Although, in order to make the explanation simple, the description in this embodiment has made on the cases where the intake control valve 107 shuts ON or OFF, that is, opens or closes the respective passages, it is possible to set the passages in a half-open state, for example, to set the opening of the control valve 107 in such a state that the main air passage 110 is half-open. This can expand the region of operating condition of the engine where swirls are generated.

Figure 6:
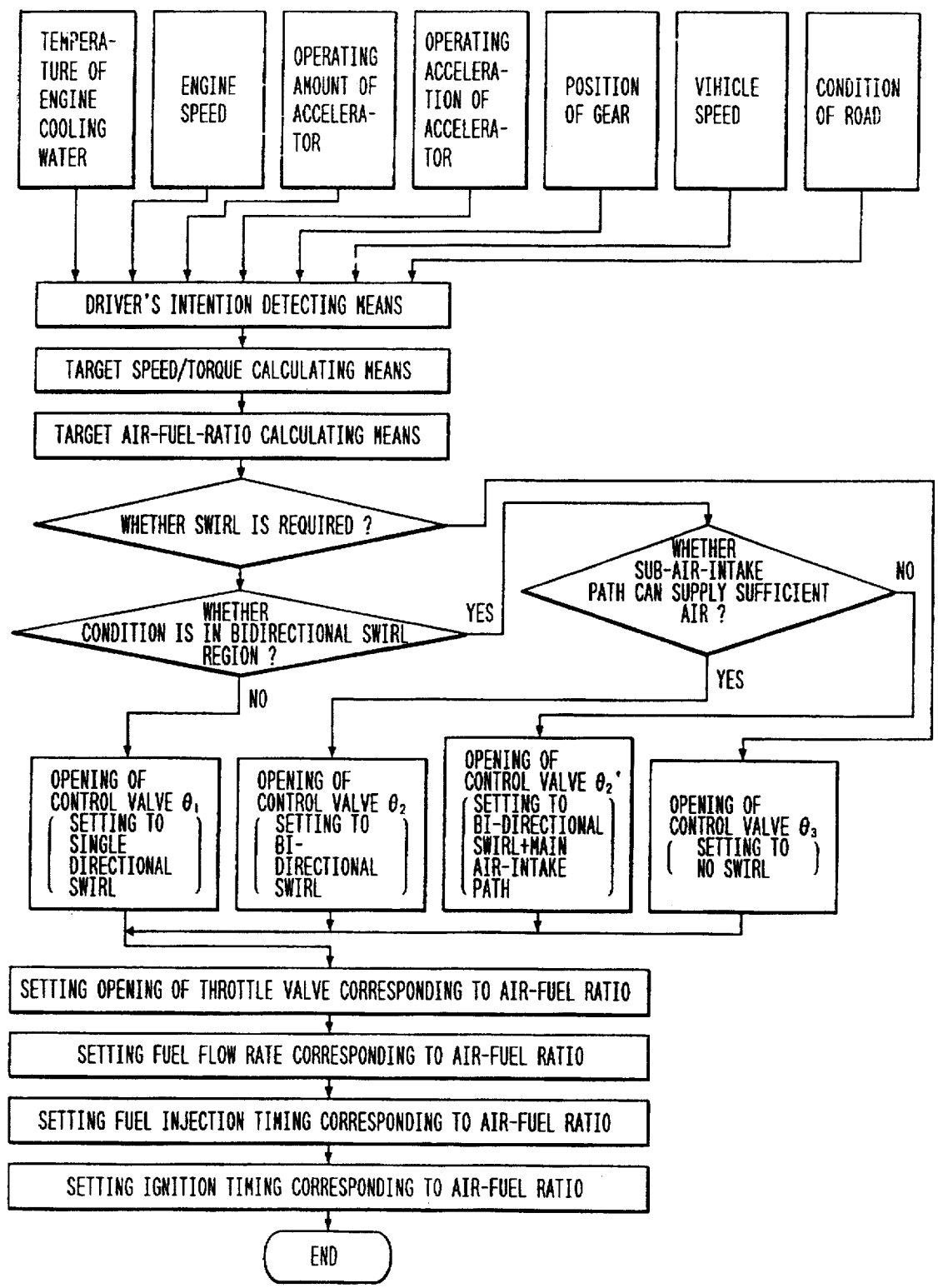
FIG. 6 is an embodiment of a flow chart for setting the opening of a control valve.

FIG. 6 shows a flow chart for setting the opening of the intake control valve when the present invention is applied to an engine in a vehicle. In the first place, the intention of a driver is detected, and the required rotating speed and the required torque of an engine are calculated. The intention of the driver is defined as a value of required shaft power calculated from, for example, the degree of a pushing-down amount of an accelerator pedal or the change in the pushing-down amount. The operating condition of the engine, that is, the rotating speed and the torque required now are calculated from the value and information on vehicle speed and gear position. Next, what swirls to be generated in the combustion chamber is optimum to the condition set based on the information is searched by referring to a map of engine control value.

First, it is judged whether the condition is suitable for a single directional swirl or not. If it is suitable for a single directional swirl state, the opening of the intake control valve is set to θ1 as shown in FIG. 3. If it is not suitable for a single directional swirl state, it is judged whether the condition is suitable for a bi-directional swirl state or not. If it is suitable for a bi-directional swirl state, it is judged whether the condition is in the region where the intake air flow rate can be sufficiently supplied only by the sub-air-intake passages or not. If the intake air flow rate can be sufficiently supplied only by the sub-air-intake passages, the opening of the intake control valve is set to θ2 as shown in FIG. 4 to generate bi-directional swirls. If the intake air flow rate cannot be sufficiently supplied only by the sub-air-intake passages, the opening of the intake control valve is set to θ2' which is an intermediate state of θ2 as shown in FIG. 4 and θ3 as shown in FIG. 5. Thereby, the operating region with bi-directional swirls can be expanded by supplying an additional air flow through the main passage by nearly the same amount of the air flow rate through the sub-air-intake passages at maximum. If the condition is not suitable either for a single directional swirl state nor a bi-directional swirl state, the opening of the intake control valve is set to θ3 to hold the main passage open. As described above, swirls suitable for an operating state can be generated in the combustion chamber and it is, therefore, possible to realize a lean burn combustion by improving combustion.

Figure 7:
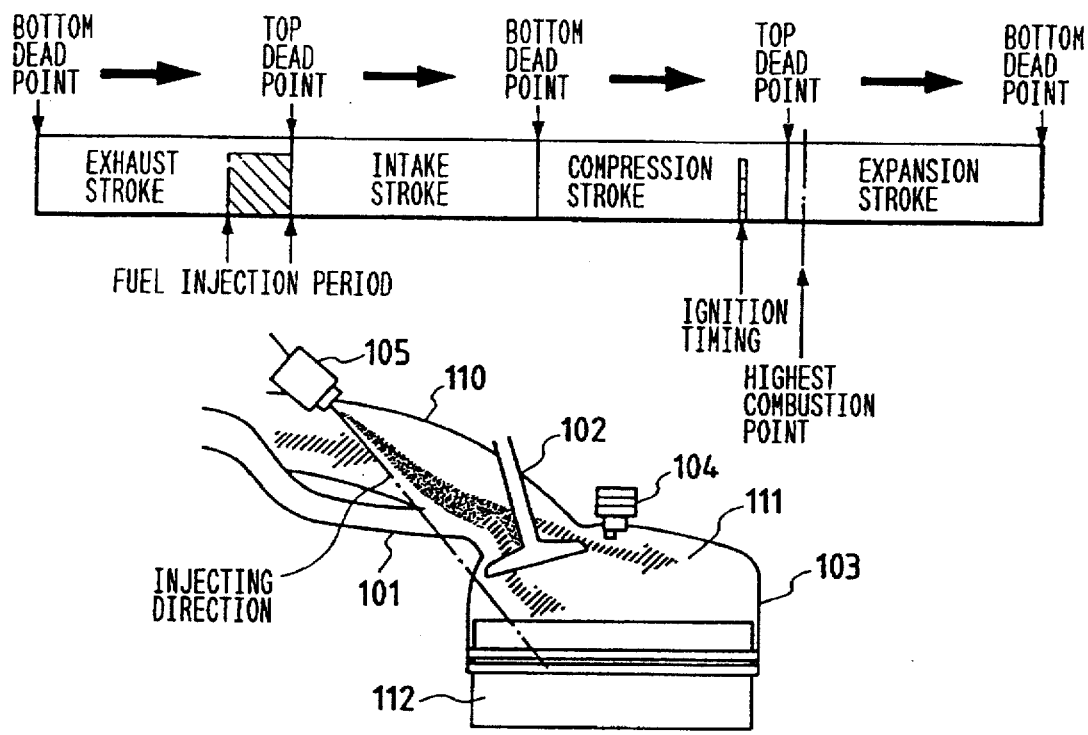
FIG. 7 is a view showing an injection timing of fuel, an ignition timing and a direction of fuel injection in a case where swirl is not generated.
Figure 8:
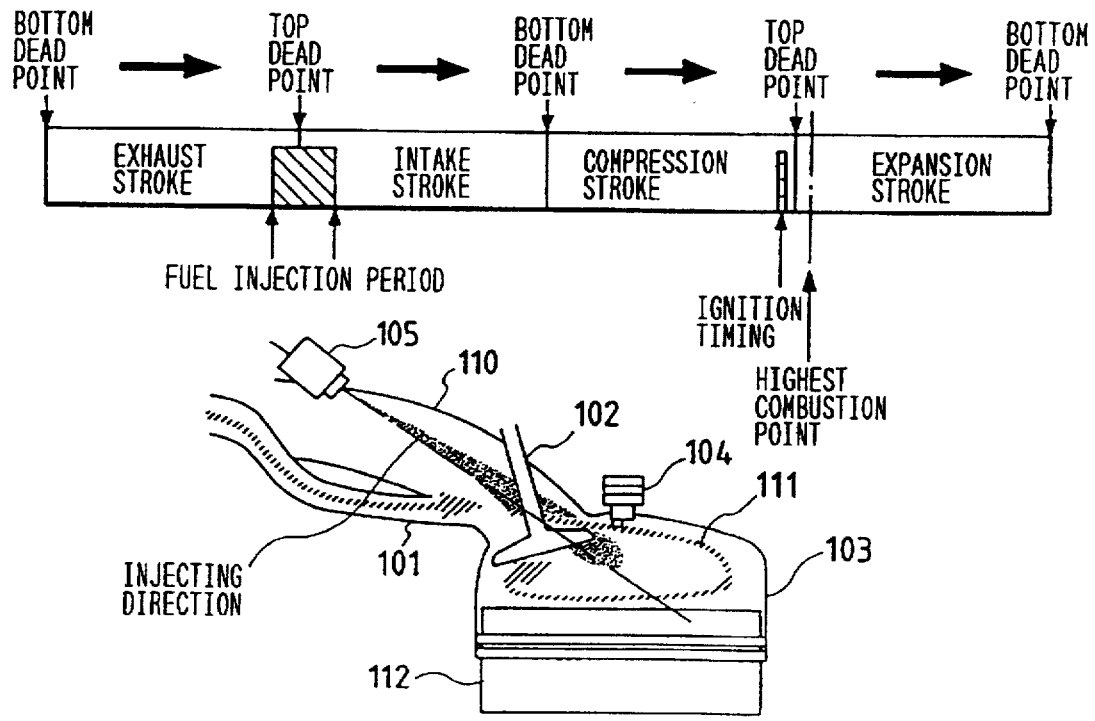
FIG. 8 is a view showing an injection timing of fuel, an ignition timing and a direction of fuel injection in a case where swirl is generated.

FIG. 7 and FIG. 8 show an embodiment of changing the injection timing of fuel, the ignition timing and the direction of fuel injection depending on the strength of swirls. The fuel injection valve 105 used is an air assist injector which promotes atomization by air and bends the fuel mist flow by the air for atomization to change the direction of fuel injection.

FIG. 7 shows a case where swirl is not generated. Air 108 flows through the main passage 110, its velocity is slow and consequently the speed of combustion is also slow. Therefore, in order to ignite the fuel well when a piston 112 comes to near the top dead point of compression, it is necessary to set the injection timing of fuel earlier and also to set the ignition timing earlier. The injecting direction of the fuel mist 106 is set such as to direct a little downward in the figure from the direction of the line connecting between the fuel injection valve, and the two intake valves and most amount of fuel is injected in that direction with considering that the mist is drifted by the air flow from the main passage 110. Thereby, dense mixture can be formed near a spark plug 104. FIG. 8 shows a case where swirl is generated. Air 108 flows through the sub-air-intake passage 101 and generates a swirl 111 having a high velocity. Therein, the speed of combustion is fast. Therefore, in order to ignite the fuel well when a piston 112 comes to near the top dead point of compression, it is necessary to set the injection timing of fuel later than in the case of FIG. 7 and also to set the ignition timing later. Since the fuel does not interfere with the intake air, the injecting direction of the fuel mist 106 is set such as to direct in the direction of the line connecting between the fuel injection valve and the two intake valves more directly than in the case of FIG. 7. Thereby, as described in connection with FIG. 4, mixing of the fuel and the air can be promoted, and the fuel mist can be suppressed to attach to the wall of the air intake pipe or the wall of the combustion chamber.

Figure 9:
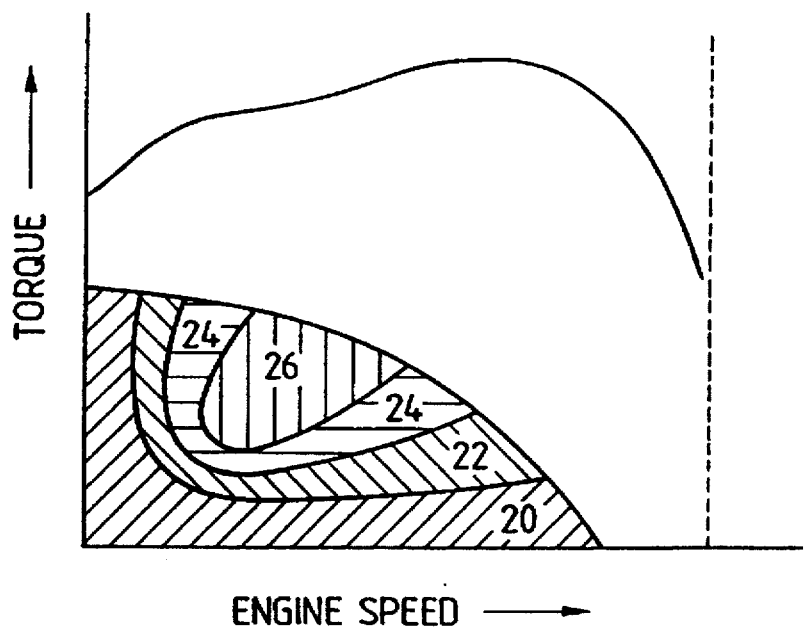
FIG. 9 is a graph showing the limit region for lean air-fuel ratio and the operable region of the engine in a case where one sub-air-intake passage is used in the construction of the first embodiment in accordance with the present invention.
Figure 10:
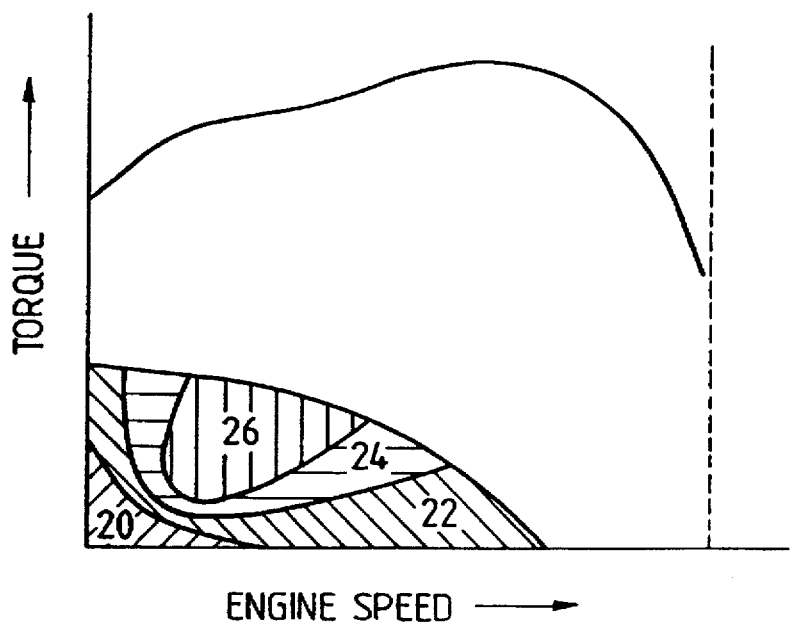
FIG. 10 is a graph showing the limit region for lean air-fuel ratio and the operable region of the engine in a case where two sub-air-intake passages are used in the construction of the first embodiment in accordance with the present invention.
Figure 11:
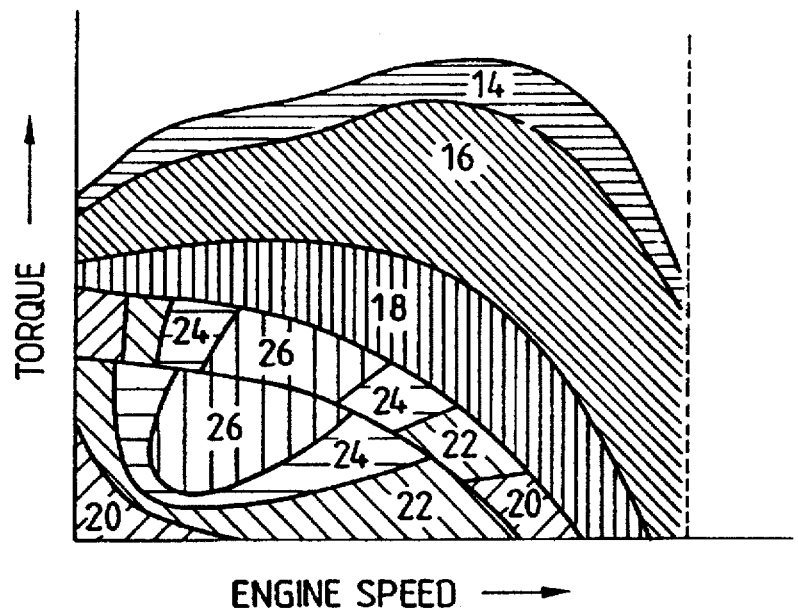
FIG. 11 is a graph showing the limit region for lean air-fuel ratio and the operable region of the engine in the first embodiment in accordance with the present invention.
Figure 12:
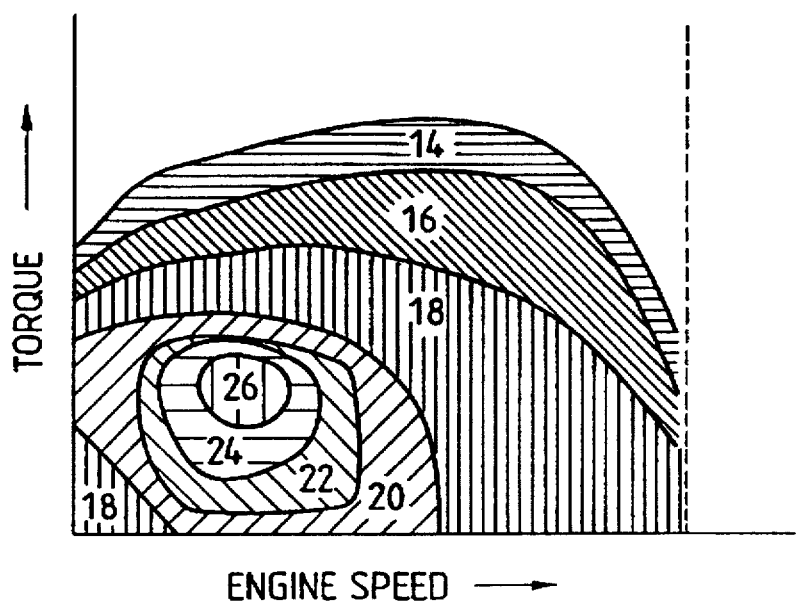
FIG. 12 is a graph showing the limit region for lean air-fuel ratio and the operable region of engine in a conventional engine with swirl generating mechanism.
Figure 13:
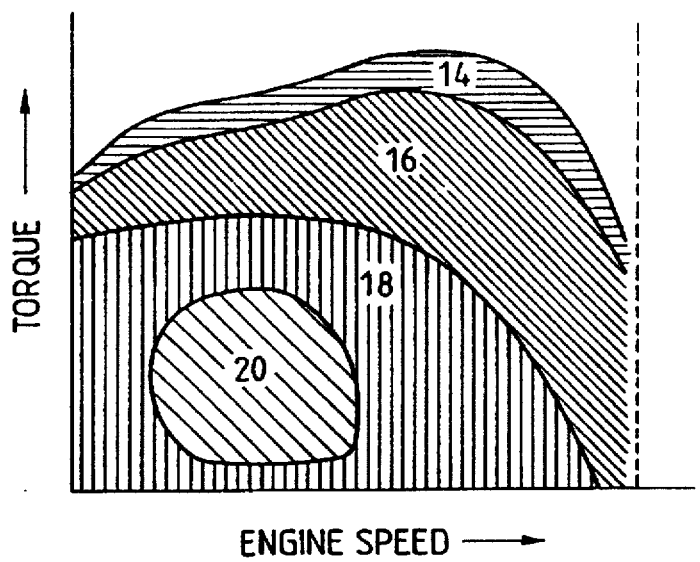
FIG. 13 is a graph showing the limit region for lean air-fuel ratio and the operable region of engine in a conventional engine without swirl generating mechanism.

FIG. 9, FIG. 10 and FIG. 11 show the limit region for lean air-fuel ratio and the operable region of the engine in the construction of the first embodiment in accordance with the present invention in a case where one sub-air-intake passage is used, in a case where two sub-air-intake passages are used, and in a case where the number of the sub-air-intake passages is varied according to the chart shown in FIG. 6, respectively. FIG. 12 and FIG. 13 show the limit region for lean air-fuel ratio and the operable region of engine in a conventional engine with swirl generating mechanism and without swirl generating mechanism, respectively.

The region outside boundary in each of the figures indicates the region where the engine cannot operate with the rotating speed and the torque at the point. Each of the numbers in the figure indicates the limit of lean air-fuel ratio in each of the regions. According to the embodiment, it can be understood that the engine according to the present invention has a wide region where the engine can be operated with lean air-fuel ratio, and can keep the same high output power as an engine without swirl generating mechanism can.

Figure 14:
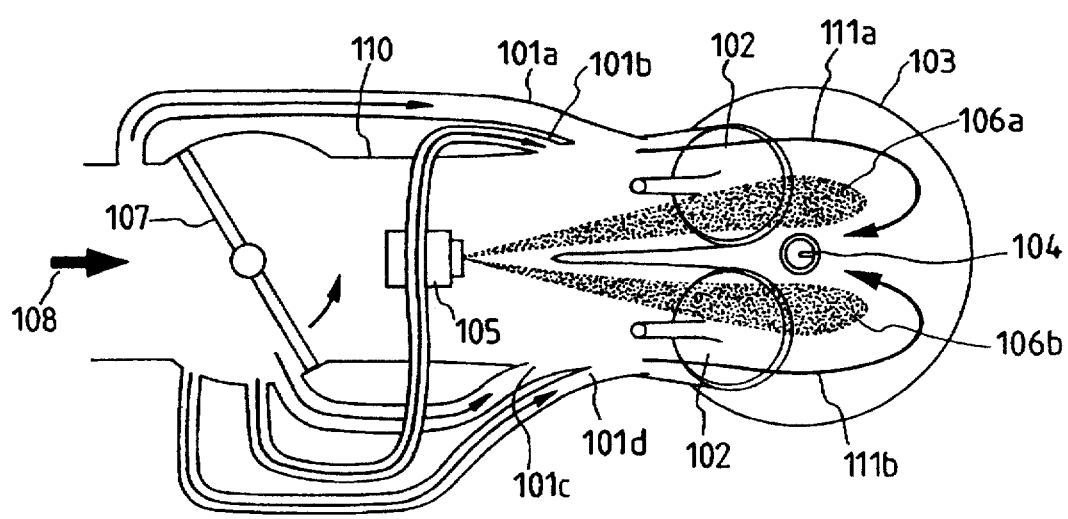
FIG. 14 is a top view showing the construction of a second embodiment in accordance with the present invention.

FIG. 14 shows the construction of a second embodiment according to the present invention. A main passage 110 of an air-intake pipe is directed toward a combustion chamber 103 of an engine having two intake valves 102. An intake control valve 107 is provided in the main passage 110, and sub-air-intake passages 101a, 101b, 101c and 101d are provided upstream of the air-intake control valve such as to bypass the main passage 110. The total cross-sectional area of the four sub-air-intake passages 101a to 101d is made such as to become ⅕ to ½ of the cross-sectional area of the upstream of the main passage 110. The intake control valve 107 is constructed such as to have a larger cross-sectional area than the cross-sectional area upstream of the main passage 110 and each of the inlets of the sub-air-intake passages 101c and 101b, 101d can be closed with the opening of the intake control valve 107 one-by-one. A fuel injection valve 105 forms two mist flows 106a and 106b directing from the main passage 110 to the two intake valves 102.

The outlets of the sub-air-intake passages 101a, 101b, 101c and 101d open to a position near the intake valve 102. Each of the air flows flowing through the sub-air-intake passages 101a and 101b and the air flows flowing through the sub-air-intake passages form a pair of jet flows which enter into the combustion chamber 103 through the gaps between the intake valve and the corresponding valve sheet from the outer side of the two intake valves 102 facing each other to generate two swirls 111a, 111b. Therein, the swirl 111a is formed such as to envelop the mist 106a, and the swirl 111b is formed such as to envelop the mist 106b. And each of the swirls circulates along the top surface of a piston 112 and then flows toward a spark plug 104. Operation of the intake control valve 107 is performed by a stepping motor 201, and setting of the opening of the intake control valve is performed by a computer 202.

With the construction described above, when the engine is operated in a low load operating state and, therefore, the amount of intake air flow rate is small, only the sub-air-intake passage 101a is used and the velocity of intake air can be increased similar to the first embodiment according to the present invention shown in FIG. 3. When the load increases and the intake air flow rate is required to be increased, bi-directional swirls can be generated using the two sub-air-intake passages 101a and 101d by opening the intake control valve 107 similar to the first embodiment according to the present invention shown in FIG. 4. When the load is further increased, the amount of intake air flow rate can be increased with keeping the bi-directional swirls using the four sub-air-intake passages 101a to 101d by opening the intake control valve 107 further. It is possible to set the opening of the control valve 107 in such a state that the main air passage 110 is half-open similar to the first embodiment according to the present invention. This can expand the region of operating condition of the engine where swirls are generated.

Although, in these embodiments, the cases of two and four sub-air-intake passages have been described, the present invention is not limited to these cases. Swirls can be generated with an arbitrary number of sub-air-intake passages. Further, although the cases of one and two swirls have been described, plural swirls can be generated in the combustion chamber by setting each of the sub-air-intake passages with varying the position and the direction of its outlet one-by-one. In this case, mixing of air and fuel is promoted to perform good combustion by changing the injection timing of fuel.

According to the present invention, since the cross-sectional area of the air-intake passage can be changed in multi-step by varying the number of sub-air-intake passages, the swirls generated inside the combustion chamber can be set to a proper strength within the wider operating region of the engine compared with a conventional engine. Thereby, the combustion in various operating condition of the internal combustion engine can be improved, and good combustion can be obtained in a case of lean combustion.

Further, since there is no need to provide swirl generating apparatus such as a helical port in the main air passage, the air-intake flow resistance of the main passage is small and a high output power can be kept.

Furthermore, a plurality of swirls can be generated inside the combustion chamber by using a plurality of sub-air-intake passages. Thereby, the disturbance in the combustion chamber can be increased with the same intake-air flow rate compared with the case where there is only one swirl, and consequently the mixing of air and fuel is promoted to improve the efficiency of combustion. Therefore, the combustion is stable even in a lean combustion a condition and the limitation of lean combustion can be expanded, and harmful components such as HC, $NO_x$ and the like in the exhaust gas can be decreased.

Still further, by regulating the injection timing of fuel, the ignition timing and the direction of fuel injection such that plural flames are generated around fuel mist and the fuel does not interfere with intake air, the fuel can be prevented from blowing aside near the wall of the combustion chamber. Thereby, good combustion can be performed in and near the center of the combustion chamber, and harmful components such as HC, $NO_x$ and the like in the exhaust gas are decreased.

We claim:

1. A control device in an internal combustion engine, wherein a swirl generating device operatively associated with the control device is configured to generate swirls in a combustion chamber of the internal combustion engine and includes bypass passages which allow air to bypass a throttle valve for regulating intake air flow rate of the internal combustion engine to control output power of the internal combustion engine and to allow the air to flow in from atmosphere to communicate with air intake ports of the internal combustion engine for respective cylinders on a downstream side of the throttle valve, wherein the control device comprises sensors configured to detect vehicle parameters including a vehicle speed, a gear position, an accelerator opening, and an intake air flow rate; and a processor operatively associated with the sensors and configured to determine internal combustion engine operating state parameters including a rotating speed and a torque based on signals from the sensors, to calculate an operating condition of the internal combustion engine according to the strength of swirl to be generated based on the operating state parameters, and to output the calculated values as control signals to the swirl generating device.

2. A control device in an internal combustion engine according to claim 1, wherein the processor is configured such that a fuel injection timing is output as a signal for the internal combustion engine operating condition.

3. A control device in an internal combustion engine according to claim 1, wherein an ignition timing is output as a signal for the operating condition of the internal combustion engine.

4. A control device in an internal combustion engine according to claim 1, wherein an injection direction of fuel is output as a signal for the operating condition of the internal combustion engine.

5. A control device in an internal combustion engine, wherein a swirl generating device operatively associated with the control device is configured to generate swirls in a combustion chamber of the internal combustion engine and includes bypass passages which allow air to bypass a throttle valve for regulating intake air flow rate of the internal combustion engine to control an output power of the internal combustion engine and to allow the air to flow in from atmosphere to communicate with air intake ports for respective cylinders on a downstream side of the throttle valve, the control device comprising sensors configured to detect vehicle parameters including a vehicle speed, a gear position, an accelerator opening, and an intake air flow rate; and a processor operatively associated with the sensors and configured to determine internal combustion engine operating state parameters including a rotating speed and a torque based on signals from the sensors and to determine a number of the bypass passages to be used based on the internal combustion engine operating state and a lean burn control signal.

6. A control device in an internal combustion engine according to claim 5, wherein the processor is configured such that a fuel injection timing is output as a signal for the internal combustion engine operating condition.

7. A control device in an internal combustion engine according to claim 5, wherein an ignition timing is output as a signal for the operating condition of the internal combustion engine.

8. A control device in an internal combustion engine according to claim 5, wherein an injection direction of fuel is output as a signal for the operating condition of the internal combustion engine.

9. A swirl generating device in an internal combustion engine to generate swirls in a combustion chamber of the internal combustion engine, comprising a plurality of bypass passages which allow air to bypass a throttle valve for regulating intake air flow rate of the internal combustion engine to control output power of the internal combustion engine and allow the air to flow in from atmosphere to communicate with air intake ports for respective cylinders on the downstream side of the throttle valve; and a mechanism operatively configured to vary a number of the bypass passages to be used according to an operating state of the internal combustion engine.

10. A swirl generating device according to claim 9, wherein means is provided for generating at least two swirls having different center axes when said bypass passages are communicated with the respective air intake ports.

11. A control device in an internal combustion engine having a swirl generating device according to claim 9, wherein an injection direction of fuel is output as a signal for the operating condition of the internal combustion engine.

12. A control device in an internal combustion engine having a swirl generating device according to claim 9, which comprises:

sensors to detector a vehicle speed, a gear position, an opening of an accelerator, an intake air flow rate and the like; and a processor to determine an operating state of the internal combustion engine such as a rotating speed, a torque and the like based on the signals form the sensors, determining number of the bypass passages to be used based on the operating state and a lean burn control signal.

13. A control device in an internal combustion engine according to claim 5, wherein an injection timing of fuel is output as a signal for the operating condition of the internal combustion engine.

14. A control device in an internal combustion engine according to claim 9, wherein an injection timing of fuel is output as a signal for the operating condition of the internal combustion engine.

15. A control device in an internal combustion engine according to claim 9, wherein an injection direction of fuel is output as a signal for the operating condition of the internal combustion engine.

16. A control device in an internal combustion engine according to claim 2, wherein the processor is configured such that a fuel ignition timing is output as a signal for the internal combustion engine operating condition.

17. A control device in an internal combustion engine according to claim 2, wherein the processor is configured such that a fuel injection direction is output as a signal for the internal combustion engine operating condition.

18. A control device in an internal combustion engine according to claim 16, wherein the processor is configured such that a fuel injection direction is output as a signal for the internal combustion engine operating condition.

19. A control device in an internal combustion engine according to claim 7, wherein the processor is configured such that a fuel injection timing is output as a signal for the internal combustion engine operating condition.

20. A control device in an internal combustion engine according to claim 19, wherein the processor is configured. Such that a fuel injection direction is output as a signal for the internal combustion engine operating condition.

21. A control device in an internal combustion engine having a swirl generating device according to claim 10, wherein the processor is configured such that a fuel injection direction is output as a signal for the internal combustion engine operating condition.

22. A control device in an internal combustion engine having a swirl generating device according to claim 10, which further comprises:

sensors configured to detect vehicle parameters including vehicle speed, a gear position, an accelerator opening, and an intake air flow rate; and a processor associated with the sensors to determine an internal combustion engine operating state of the including rotating speed and torque based on signals from the sensors, determining number of the bypass passages to be used based on the operating state and a lean burn control signal.

23. A control device in an internal combustion engine according to claim 22, wherein the processor is configured such that a fuel injection timing of fuel is output as a signal for the internal combustion engine operating state.

24. A control device in an internal combustion engine according to claim 23, wherein the processor is configured such that a fuel injection timing is output as a signal for the internal combustion engine operating state.

25. A control device in an internal combustion engine according to claim 24, wherein the processor is configured such that a fuel injection direction is output as a signal for the internal combustion engine operating state.

26. A method for improving combustion in an internal combustion engine, comprising the steps of (a) determining an operating state of the internal combustion engine from sensed signals;

(b) calculating an operating condition of the internal combustion engine according to swirl strength to be generated based upon the operating state;

(c) outputting the calculated operating condition as control signals;

(d) in response to the control signals, allowing air to bypass a throttle valve for regulating intake air flow rate of the internal combustion; and (e) generating swirls in a combustion changer of the internal combustion engine to control output power and to allow the air to flow thereinto from an atmospheric side to communicate with air intake ports for respective cylinders o the downstream side of the throttle valve.

* * * * *

UNITED STATES PATENT AND TRADEMARK OFFICE
CERTIFICATE OF CORRECTION

PATENT NO. : 5,671,713
DATED : September 30, 1997
INVENTOR(S) : Yamaguchi et al.

It is certified that error appears in the above-indentified patent and that said Letters Patent is hereby corrected as shown below:

In the title, item [54], Col. 1, line 1; please correct the title from "CONTROL DEVICE AND APPARATUS FOR GENERATING SWIRLS IN INTERNAL COMBUSTION ENGINE" to --CONTROL DEVICE AND DEVICE FOR GENERATING SWIRLS IN INTERNAL COMBUSTION ENGINE--.

Signed and Sealed this

Fifteenth Day of September, 1998

Attest:

BRUCE LEHMAN

*Attesting Officer*

*Commissioner of Patents and Trademarks*